(12) United States Patent
Kimura et al.

(10) Patent No.: US 9,249,788 B2
(45) Date of Patent: Feb. 2, 2016

(54) ELECTRIC FAN

(75) Inventors: Hiroshi Kimura, Kiryu (JP); Hiroki Masuyama, Kiryu (JP); Keiichi Hosoi, Kiryu (JP); Shinya Saito, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 283 days.

(21) Appl. No.: 13/978,786

(22) PCT Filed: Jan. 10, 2012

(86) PCT No.: PCT/JP2012/050232
§ 371 (c)(1),
(2), (4) Date: Jul. 9, 2013

(87) PCT Pub. No.: WO2012/096247
PCT Pub. Date: Jul. 19, 2012

(65) Prior Publication Data
US 2013/0287605 A1 Oct. 31, 2013

(30) Foreign Application Priority Data

Jan. 11, 2011 (JP) ................................. 2011-002953

(51) Int. Cl.
*F04B 17/03* (2006.01)
*F04D 25/06* (2006.01)
(Continued)

(52) U.S. Cl.
CPC ............ *F04B 17/03* (2013.01); *F04D 25/0613* (2013.01); *F04D 29/083* (2013.01); *H02K 5/10* (2013.01); *H02K 7/14* (2013.01)

(58) Field of Classification Search
CPC ... F04D 17/16; F04D 25/0613; F04D 25/062; F04D 29/083; H02K 5/10; H02K 7/14; F04B 17/03

USPC ......... 417/354, 410.1, 423.1, 423.11, 423.14; 415/170.1, 171.1, 174.3, 174.5
See application file for complete search history.

(56) References Cited

U.S. PATENT DOCUMENTS 6,158,985 A * 12/2000 Watanabe et al. ......... 417/423.14
6,551,074 B2 * 4/2003 Kudo et al. .................... 417/354
(Continued)

FOREIGN PATENT DOCUMENTS

EP        2068003 A2 *  6/2009  .......... F04D 25/0613
JP      2004-040934 A    2/2004
(Continued)

OTHER PUBLICATIONS

International Search Report from corresponding International Patent Application No. PCT/JP2012/050232 filed Jan. 10, 2012.

*Primary Examiner* — Devon Kramer
*Assistant Examiner* — Patrick Hamo
(74) *Attorney, Agent, or Firm* — Kenyon & Kenyon LLP

(57) ABSTRACT

This electric fan has a rotation shaft that is provided rotatably with respect to a stator, a rotor yoke provided on the rotation shaft and formed in a bottomed cylindrical shape so as to cover the stator from a front surface, and a bracket that fixes the stator to a fan shroud and is formed so as to cover a rear surface of the stator, with a fan body provided so as to integrally rotate with the rotation shaft and the rotor yoke. The fan body has a fan boss formed in a bottomed cylindrical shape so as to cover the rotor yoke from a front surface, and a plurality of blades that is provided protruding radially from an outer circumferential surface of the fan boss. A first labyrinth portion is provided between an opening portion of the fan boss and the fan shroud.

12 Claims, 5 Drawing Sheets

(51) Int. Cl.
*H02K 5/10* (2006.01)
*F04D 29/08* (2006.01)
*H02K 7/14* (2006.01)

(56) References Cited

U.S. PATENT DOCUMENTS

| | | | |
|---|---|---|---|
| 6,874,990 B2 * | 4/2005 | Nadeau | 415/173.5 |
| 8,678,785 B2 * | 3/2014 | Nogami et al. | 417/410.1 |
| 9,033,680 B2 * | 5/2015 | Kudo et al. | 417/354 |
| 2012/0032542 A1 * | 2/2012 | Liu et al. | 310/88 |

FOREIGN PATENT DOCUMENTS

| | | |
|---|---|---|
| JP | 2004-222484 A | 8/2004 |
| JP | 2008-306917 A | 12/2008 |
| JP | 2010-098817 A | 4/2010 |

* cited by examiner

ELECTRIC FAN

TECHNICAL FIELD

The present invention relates to an electric fan that is used, for example, to cool down the radiator of an automobile.

Priority is claimed on Japanese Patent Application No. 2011-002953, filed Jan. 11, 2011, the content of which is incorporated herein by reference.

BACKGROUND ART

Conventionally, there are cases that an outer-rotor type electric brushless motor is used as an electric fan to cool down a radiator of an automobile. This type of electric motor is provided with a stator that is formed by a coil wound on a plurality of teeth, a bottomed cylindrical rotor yoke that covers the stator from a front, a permanent magnet that is arranged at an inner periphery of the rotor yoke, and a rotating shaft that is provided in a center of the stator in a radial direction and that supports the rotor yoke rotatably.

Also, fan blades are provided on an outer periphery of the rotor yoke. When electric current is supplied to the coil, an electrical field is formed around the stator teeth. As a result, electromagnetic attraction and repulsion which cause the rotor yoke to rotate are generated between the stator teeth and the permanent magnet of the rotor yoke and cooling air is generated in an axial direction of the rotating shaft by the fan blades.

In the aforementioned electric motor, since the rotor yoke rotates on an outer side of the stator, a separate cover is required in order to ensure water-tightness of the interior, and this leads to an increase in size of the electric motor. For this reason, electric motors are usually configured as an open type in which the rotor yoke is exposed, and as a result it is inevitable for water to easily enter from the outside.

For example, the motor that is disclosed in Patent Literature 1 is provided with a structure in which a waterproof wall is provided to prevent the infiltration of water from an air intake at a front surface of the rotor yoke that is provided to cool down the interior, and a drain hole is provided to discharge water to the outside when water intrudes.

Also, a motor holder is provided in the stator so as to block an opening of the rotor yoke. By this motor holder, infiltration of water into the interior of the rotor yoke is suppressed.

CITATION LIST

Patent Literature

[Patent Literature 1] Japanese Unexamined Patent Application, First Publication No. 2004-40934

SUMMARY OF INVENTION

Problem to be Solved by the Invention

However, since the motor according to the aforementioned related art is provided with a structure in which the rotor yoke rotates with respect to the motor holder, it is necessary for a gap to be formed between the motor holder and the opening of the rotor yoke. In addition to water intruding from this gap into the interior, since the intrusion path is formed simply, it is not possible to effectively suppress intrusion of water into the interior of the rotor yoke.

Having regard to the above circumstances, the present invention is directed to provide an electric fan that can effectively suppress the intrusion of water into the interior of a motor.

Means for Solving the Problem

In order to solve the aforementioned problems, in a first aspect of the present invention, an electric fan is provided with an electric motor, a fan body that is attached to the electric motor, and a fan shroud that fixes the electric motor. The electric motor includes a stator on which coils are wound, a rotation shaft provided in a center of the stator in the radial direction, and that is provided rotatably with respect to the stator, the rotor yoke provided on the rotation shaft and that is formed in a bottomed cylindrical shape so as to cover the stator from a front surface thereof and a bracket formed so as to cover a rear surface of the stator and that fixes the stator to the fan shroud. The fan body is provided so as to integrally rotate with the rotation shaft and the rotor yoke. The fan body includes a fan boss formed in a bottomed cylindrical shape so as to cover the rotor yoke from the front surface thereof, and a plurality of blades that is provided so as to protrude radially from an outer circumferential surface of the fan boss. And, a first labyrinth portion is provided between the opening portion of the fan boss and the fan shroud.

With the aforementioned configuration, it is possible to cover the electric motor with the fan boss and the fan shroud. Also, since the first labyrinth portion is formed between the fan boss and the fan shroud, the intrusion path of the water into the interior of the electric motor is made complicated. For that reason, it is possible to effectively suppress the infiltration of water into the interior of the electric motor.

According to a second aspect of the present invention, the fan shroud includes a base portion to which the bracket is attached, and a cylindrical first infiltration restriction wall formed at an outer circumferential portion of the base portion so as to rise up toward the fan body side, and that covers the opening portion of the fan boss from the outer side in the radial direction. The circumferential wall of the fan boss and the first infiltration restriction wall are formed so as to overlap each other in the radial direction. The first labyrinth portion is configured of the circumferential wall of the fan boss and the first infiltration restriction wall.

With the aforementioned configuration, it is possible to form the first labyrinth portion with a simple structure, and it is possible to reliably suppress the infiltration of water into the interior of the electric motor at a low cost.

According to a third aspect of the present invention, a cylindrical second infiltration restriction wall is formed rising up at the base portion so as to extend to a near side of the circumferential wall of the fan boss, more to the inner side than the first infiltration restriction wall in the radial direction.

With the aforementioned configuration, a blind alley is formed by the base portion of the fan shroud, the first infiltration restriction wall and the second infiltration restriction wall. The intrusion path of water is formed long and complicated since this blind portion is provided, and moreover, it is possible to suppress the infiltration of water into the interior of the electric motor.

According to a fourth aspect of the present invention, a second labyrinth portion is provided between the fan shroud and the bracket.

With the aforementioned configuration, it is possible to prevent the infiltration of water into the interior of the electric motor from the rear of the fan shroud. Also, even in the case of water having intruded from the outer circumferential portion of the fan boss into the interior of the fan boss, it is possible to discharge the water to the outside using the second labyrinth. For that reason, it is possible to prevent water from accumulating in the interior of the fan boss.

According to a firth aspect of the present invention, the base portion of the fan shroud is formed in an approximate annular shape so that the center portion is largely open, and so as to overlap in the axial direction with the outer circumferential portion of the bracket. Moreover, the fan shroud is provided so that a gap is formed between the base portion and the bracket, and a second labyrinth portion is configured of the bracket and the base portion.

With the aforementioned configuration, it is possible to form a second labyrinth portion with a simple structure. For that reason, it is possible to inexpensively suppress the intrusion of water into the interior of the electric motor, and it is possible to discharge the water that has intruded into the interior to the outside. Moreover, since the gap is provided, cooling effect for the bracket is enhanced, and it is possible to suppress heat damage to the electric motor.

According to a sixth aspect of the present invention, the rotor yoke in the first aspect to the filth aspect has a bottom wall and a circumferential wall that is formed so as to rise up from the bottom wall in the axial direction. A boss portion that protrudes to the same side as the circumferential wall is integrally formed in the center of the rotor yoke in the radial direction. Moreover, a water shield ring is attached around the boss portion, in a near side of the stator from the inner side surface side of the bottom wall, and a third labyrinth portion is provided between the water shield ring and the stator.

With the aforementioned configuration, even in the case of water having intruded into the interior of the rotor yoke, it is possible to prevent the bearings from getting wet. For that reason, leakage of the lubricant front the hearings is suppressed, and the resistance against sound vibration and the durability are improved.

Effects of the Invention

According to the present invention, it is possible to cover an electric motor with a fan boss and a fan shroud. Also, due to the formation of a first labyrinth portion between the fan boss and the fan shroud, the intrusion path of water into the interior of the electric motor is made complicated. For that reason, it is possible to effectively suppress the infiltration of water into the interior of the electric motor.

DESCRIPTION OF EMBODIMENTS

Electric Fan

Next, one embodiment of the present invention will be described based on the drawings.

Figure 1:
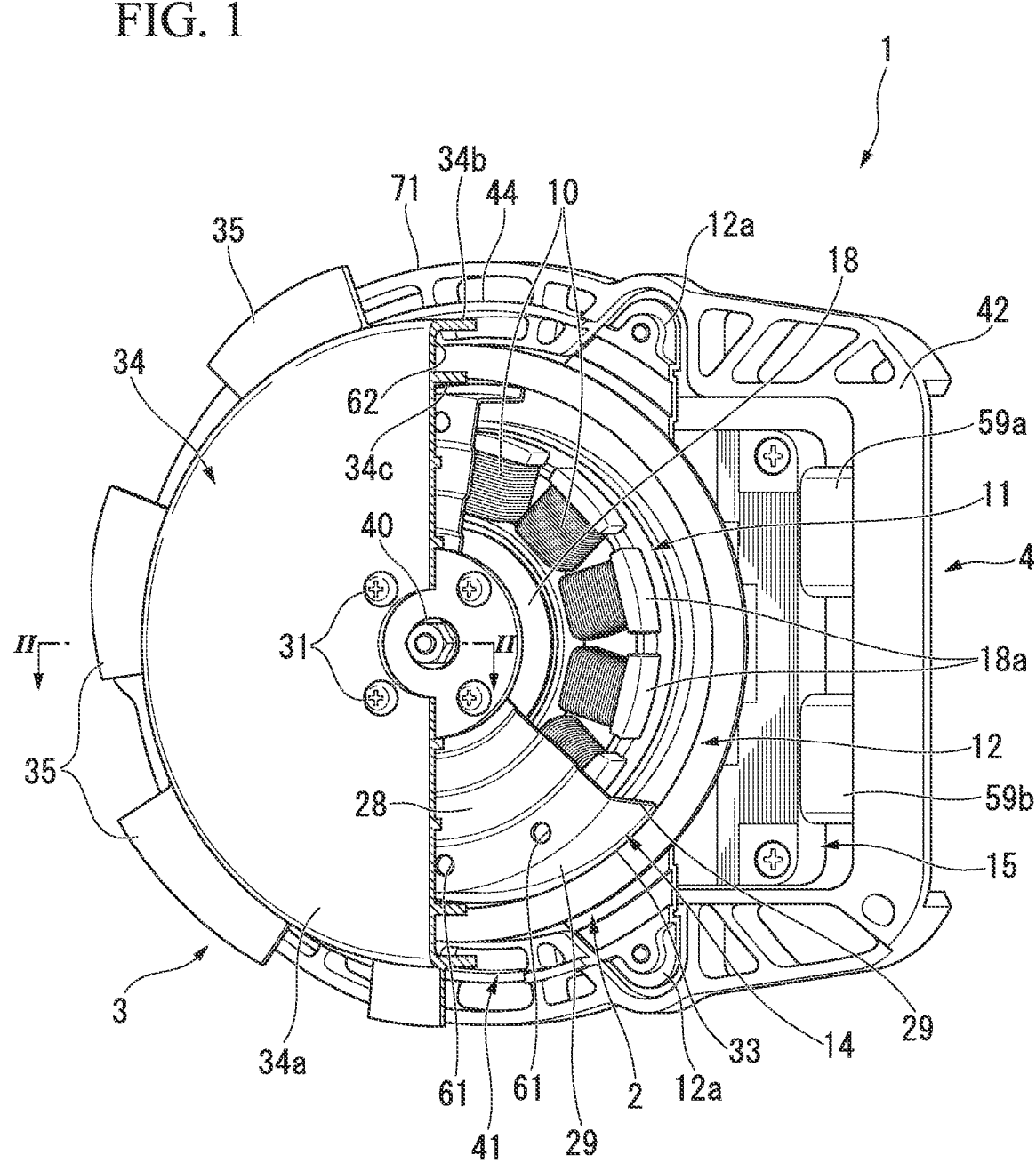
FIG. 1 is a plan view in which a portion of the fan boss of the electric fan in one embodiment of the present invention has been cut away.
Figure 2:
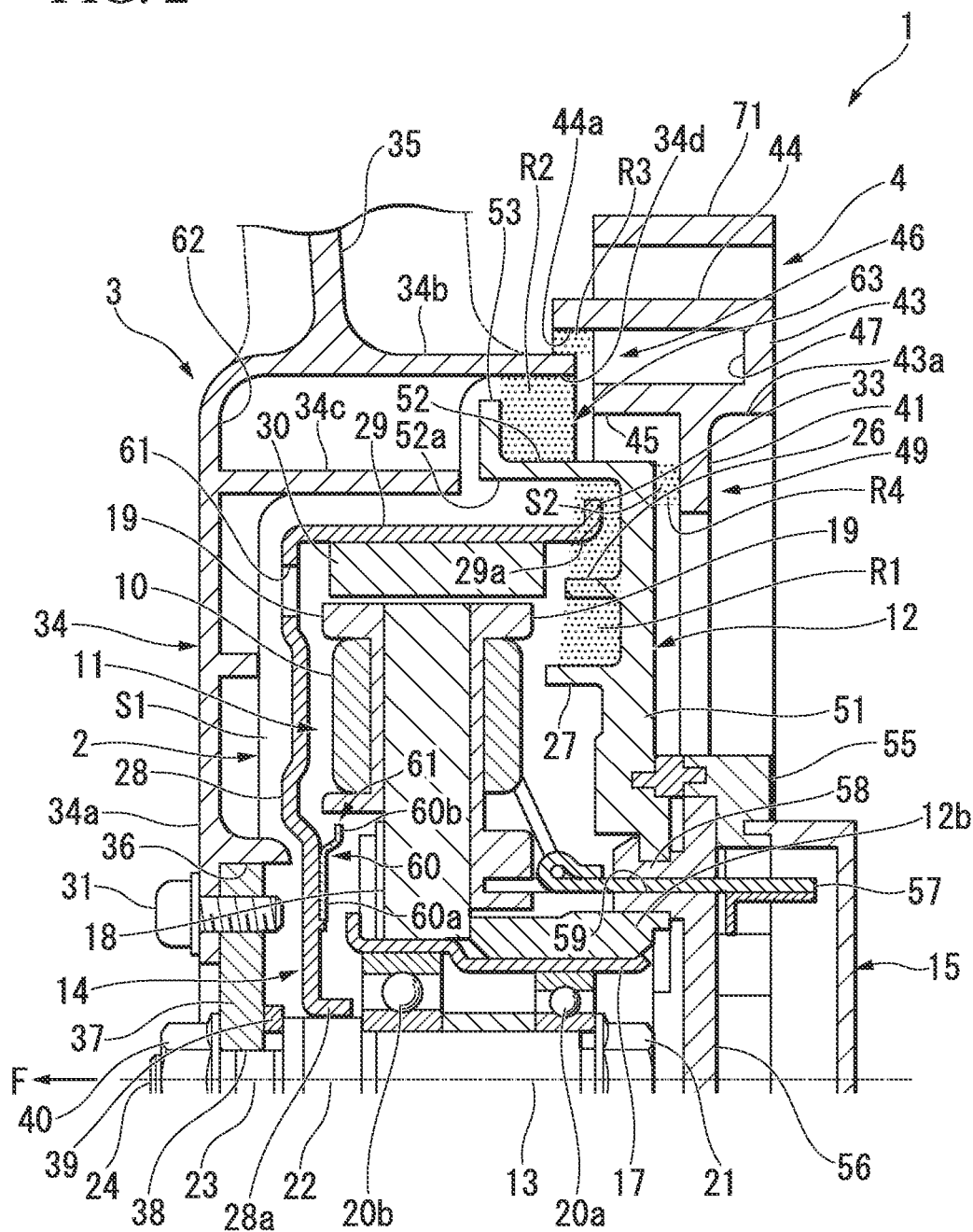
FIG. 2 is a cross-sectional view cutting the electric fan in one embodiment of the present invention along the vertical direction.

FIG. 1 is a plan view in which a portion of the electric fan has been cut away, and FIG. 2 is a cross-sectional view cutting the electric fan along the vertical direction. Further, the arrow F in FIG. 2 denotes the front side of a vehicle. In the description below, the description is given expressing the direction denoted by the arrow F (the leftward direction in FIG. 2) as "front," the opposite direction of the direction denoted by the arrow F (the rightward direction in FIG. 2) as "back," and the like.

As shown in FIG. 1 and FIG. 2, the electric fan 1 is a member that is used, for example, to cool down the radiator of a vehicle, and is installed on the front side of the radiator (not shown). The electric fan 1 is provided with an electric motor 2 that is a driving source, and a fan body 3 that is driven rotationally by the electric motor 2. In the electric fan 1, the electric motor 2 is configured so as to be attached to the radiator (not shown) via a fan shroud 4.

(Electric Motor)

The electric motor 2 is configured of an outer rotor-type brushless motor, and is provided with a stator 11 on which a plurality of coils 10 for excitation is mounted, a bracket 12 that supports the stator 11, a rotation shaft 13 that is supported rotatably by the bracket 12, a rotor yoke 14 that is formed by press molding a steel sheet and that is coupled to the rotating shaft 13 in an integrally rotatable manner, and a control unit 15 that controls the electrification of the coils 10 by feeding back the rotation of the rotor yoke 14.

The stator 11 has an annular-shaped stator core 18 that is formed by laminating a plurality of metal plates. A plurality of teeth 18a that project radially toward the outside along the radial direction is provided on the stator core 18. The coils 10 are wound on these teeth 18a via an insulator 19 that is an insulating member. Further, the stator core 18 may also be formed by pressing a soft magnetic powder.

The bracket 12 is a member in which a base portion 51 that is formed in an approximate disk shape so as to cover the rear surface of the stator 11, and an approximately cylindrical infiltration restriction wall 52 that is formed so as to rise from the outer edge of the base portion 51 toward the front are integrally molded. The infiltration restriction wall 52 is a member that suppresses the infiltration of water into the interior of the rotor yoke 14. An outer flange portion 53 toward the outer side in the radial direction is integrally molded at an opening edge 52a of the infiltration restriction wall 52. Further, in the present embodiment, some sections of the outer flange portion 53 form a double infiltration restriction wall that comprises a wall portion that is formed so as to rise up from the base portion 51 toward the front in parallel with the infiltration restriction wall 52, at the position of the overhang width to the outer side in the radial direction of the outer flange portion 53, and as described below, the gap between a circumferential wall 34b of a fan boss 34 and the outer flange portion 53 is configured so as to be constant.

Figure 5:
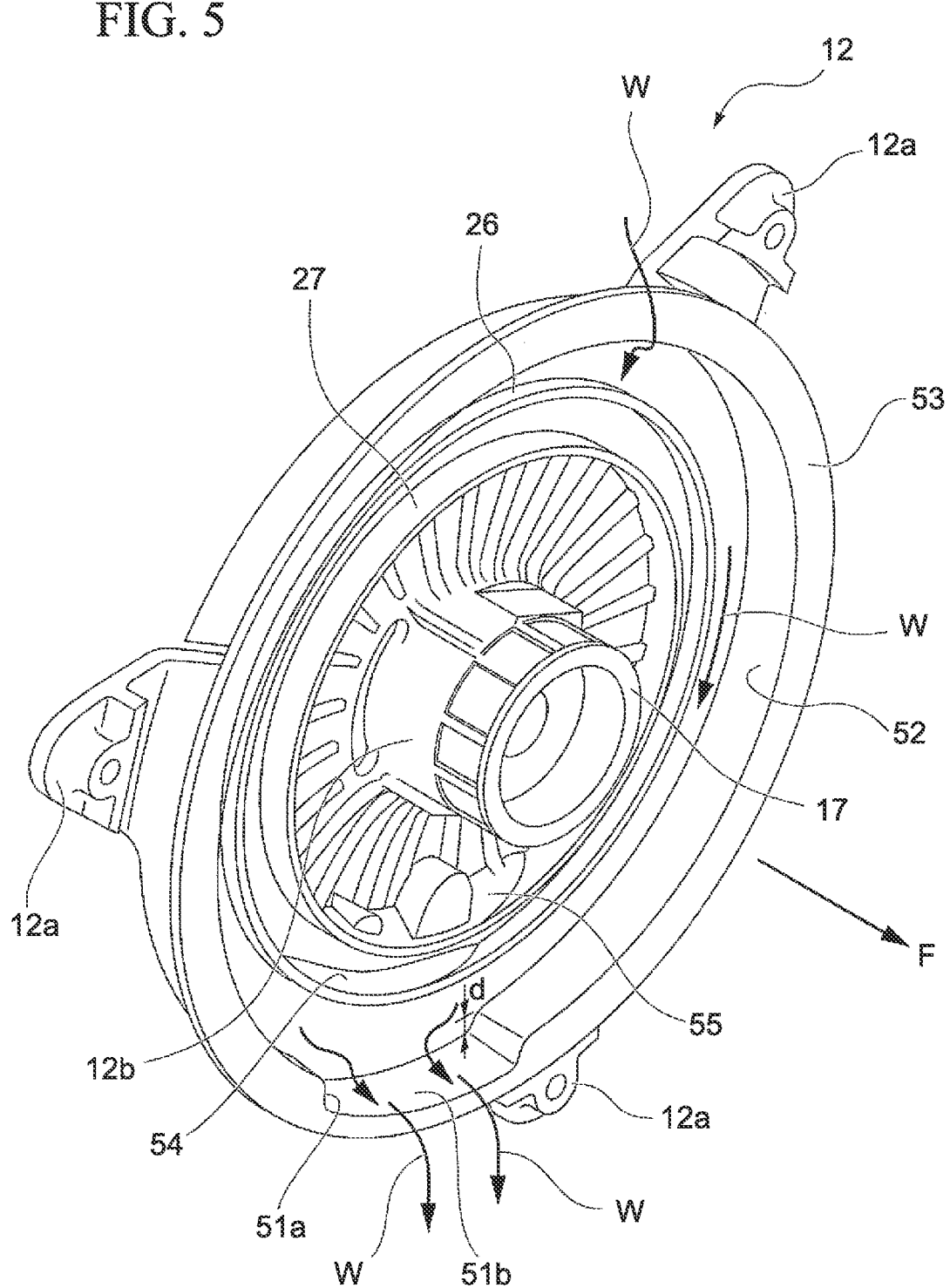
FIG. 5 is a perspective view of the bracket in one embodiment of the present invention.

FIG. 5 is a perspective view that shows the bracket 12 alone from the front side. In the infiltration restriction wall 52 that is arranged at the outermost circumference side of the bracket 12, the entire region of the inner circumference surface is formed in a circular curved shape except for the vertically downward region. In the bracket 12, a concave portion 51a is formed of which the base portion side is recessed by a predetermined depth d in a stepped shape with respect to the region of the inner circumferential surface that forms the circular curved surface (the general portion of the inner circumferential surface). The inner circumferential surface of the infiltration restriction wall 52, as shown in FIG. 2, is a portion that faces, with a gap, the end edge at the opening side of the circumferential wall 29 of the rotor yoke 14 (including the outer flange portion 33), in the state of that the rotor yoke 14 is attached to the bracket 12. On the other hand, since the concave portion 51a that is formed at the vertically downward region is formed recessed to the outer side in the radial direction with respect to the general portion, the separation width between the concave portion 51a and the edge portion at the opening end side of the rotor yoke 14 is partially expanded with respect to the other regions (general portion).

The concave portion 51a is formed in a groove shape over a range extending from the base portion of the water infiltration restriction wall 52 (the region that rises approximately horizontally from the vertical surface of the bracket 12) to the extended end. The bottom surface 51b of this concave portion 511a is formed by an inclined surface that inclines downward from the base portion toward the extended end.

Accordingly, a drop of water that has made its way to the inner circumferential side of the infiltration restriction wall 52 runs down along the inner circumferential surface of the infiltration restriction wall 52 and the outer circumferential surface of a cylindrical wall 26, which is a vertical surface of the bracket 12. Then, after flowing into the concave portion 51a at the lower region, it is discharged to the outside through the gap between the edge portion at the opening side of the rotor yoke 14 and the concave portion 51a.

Here, the depth d of the recession of the concave portion 51a that is formed in the water infiltration restriction wall 52 is set to a depth such that, in the case of a water drop adhering by surface tension to the corner of the base portion side of the water infiltration restriction wall 52 in the concave portion 51a, and that drop freezing and turning into a lump of ice, that lump of ice does not make contact with the edge portion at the opening side of the rotor yoke 14.

Further, the infiltration restriction wall 52 may be formed so that the gap with the circumferential wall 34b of the fan boss 34 slightly increases at the outer circumference at the ground side in the vertical direction, and so that the discharge of water drops that have flowed to the lower region at the inner side of the circumferential wall 34b may be more easily discharged to the outside of the fun boss 34.

Further, in FIG. 5, reference signs 54 and 55 denote tapered surfaces for water drop discharge that are formed at each vertical lower region of the inner circumferential surface of the cylindrical walls 26 and 27.

On the other hand, fixing arms 12a are provided on the base portion 51 so as to extend from the outer circumferential edge toward the outside in the radial direction. The fixing arms 12a are members that fix the bracket 12 to the fan shroud 4 by fastening.

Also, a cylindrical boss portion 12b is provided in a protruding manner at the center in the radial direction on the front surface side of the base portion 51. A stator fixing pipe 17 shaped approximately in a cylinder that fixes the stator 11 on the outer circumferential side is attached to the boss portion 12b.

The stator fixing pipe 17 is provided with one end side fixed by press-fitting into the interior of the boss portion 12b, and the other end side that projects out toward the front from the front end portion of the boss portion 12b. On the outer circumferential surface of the region of the stator fixing pipe 17 that projects from the boss portion 12b to the front, the stator core 18 is fitted and fixed.

Also, at the front surface of the base portion 51, the two cylindrical walls 26 and 27 whose outer diameters are smaller than that of the infiltration restriction wall 52 are formed in a concentric manner on the boss portion 12b. The cylindrical walls 26 and 27 are members that trickle down water droplets along the outer circumferential surface of the bracket 12, when the water droplets intrudes into the interior of the rotor yoke 14 and flowed from the outer circumferential side of the upper portion of the bracket 12 into the center side where electrical contacts and the control unit 15 are arranged.

The rotation shaft 13 is provided in a manner extending approximately horizontal so as to head in the front-back direction of the vehicle, and is supported rotatably by the boss portion 12b of the bracket 12 and the stator fixing pipe 17 via a pair of bearings 20a and 20b. The back end portion of the rotation shaft 13 projects out to the back side from the bearing 20a, and a sensor ring 21 for rotation detection is attached to that protruding end. Rotation of the rotation shaft 13 that is detected by the sensor ring 21 is output to the control unit 15 as rotation information of the rotor yoke 4.

The control unit 15 has a sensor case 55 that is fixed to the bracket 12 via screws that are not shown on the drawing. A Hall-effect sensor (not shown) which detects the changes in the magnetic field generated by the sensor ring 21 is mounted on a control substrate 56. And, the control substrate 56 and the like are housed in the sensor case 55. In addition to the Hall-effect sensor, drive circuits are also provided on the control substrate 56, including a switching element and a rectifying circuit and the like that supplies electric current in turn to the predetermined coils 10.

Here, the control substrate 56 and the coils 10 are electrically connected with each other via the connection terminal 57. A conduction portion 58 that guides the connection terminal 57 is formed so as to project out on the bracket 12 side of the sensor case 55. An insertion hole 59 that penetrates the sensor case 55 in the thickness direction is formed in the conduction portion 58. The connection terminal 57 is inserted in the insertion hole 59.

Also, connector portions 59a and 59b that output the output signal from the control substrate 56 to an external control device (not shown) are provided on the sensor case 55 protruding toward the outer side. A harness that extends from the external control device (not shown) is connected to the connector portions 59a and 59b, whereby the output signal from the control substrate 56 is output to the control device.

On the other hand, the front end portion of the rotation shaft 13 protrudes from the bearing 20b to the front side, and the rotor yoke 14 and the fan body 3 are attached on the protruding portion.

Specifically, in the protruding region of the rotation shaft 13 on the front side, a rotor support portion 22 is formed with an expanded diameter adjacent to the bearing 20b, and a fan fixing portion 23 with a smaller diameter than the rotor support portion 22 is formed adjacent to the rotor support portion 22. A male thread portion 24 with a smaller diameter than the fan fixing portion 23 is formed further to the distal end side of the rotation shaft 13 than the fan fixing portion 23.

The rotor yoke 14 is a member that is formed in a bottomed cylindrical shape so as to cover the stator 11 from the front surface. The rotor yoke 14 has a bottom wall 28, and a circumferential wall 29 that is formed so as to rise up from the bottom wall 28 toward the rear in the axis direction. A plurality of drain holes 61 is formed at equally spaced intervals in the circumferential direction on the outer circumferential side of the bottom wall 28. The drain holes 61 have a function to discharge water that has intruded into the interior of the rotor yoke 14. In addition, the drain holes 61 have a function to discharge air from the interior of the rotor yoke 14.

Also, at the center of the bottom wall 28 in the radial direction, a boss portion 28a that protrudes to the same side as the circumferential wall 29 is integrally formed. The boss portion 28a is press-fitted and fixed to the outer circumference of the rotor support portion 22 of the rotation shaft 13.

Figure 4:
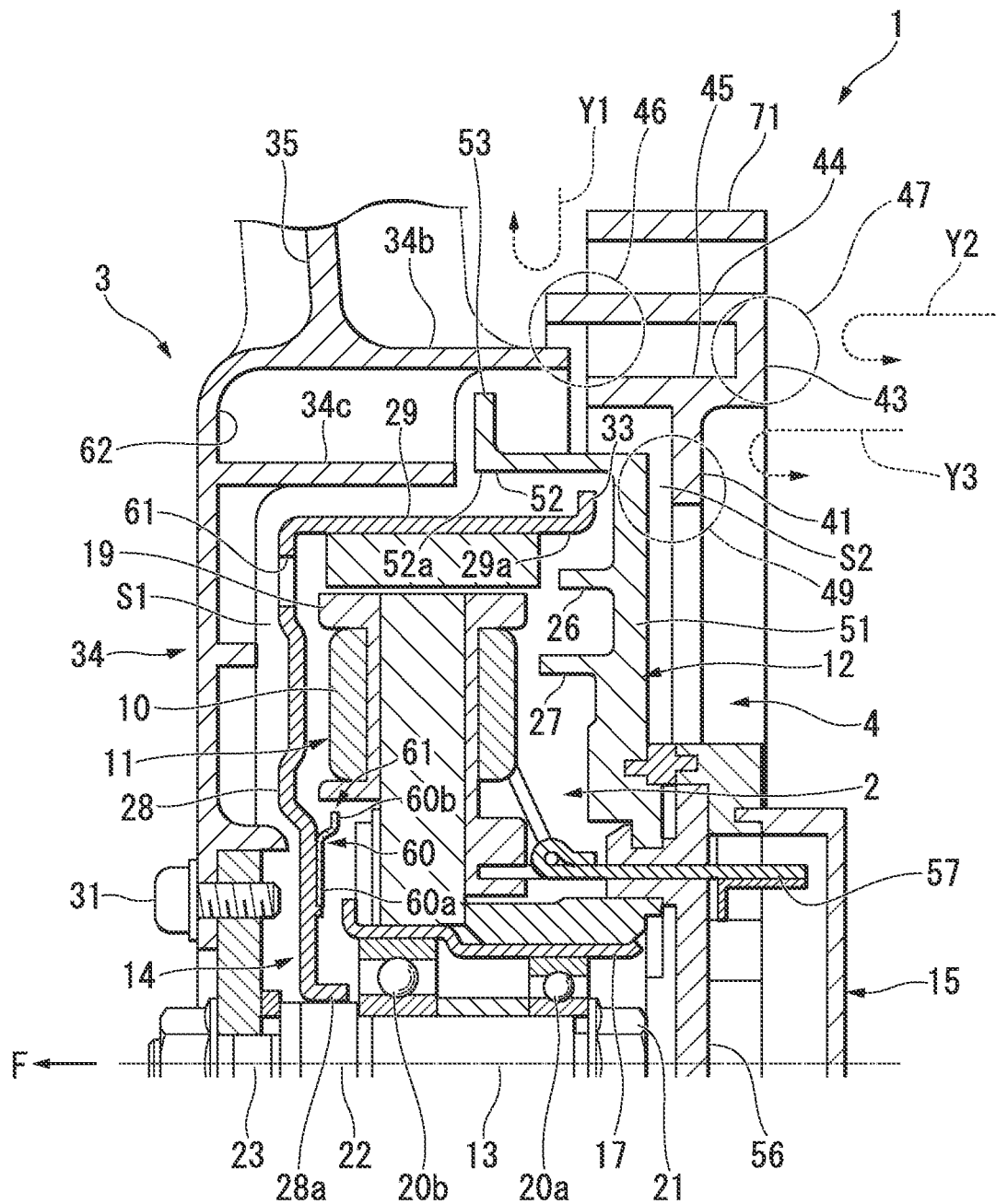
FIG. 4 is an explanatory drawing for the behavior of water in the case of water being splashed on the outer circumferential portion of the fan shroud in one embodiment of the present invention.

As shown in FIG. 2 and FIG. 4, around the boss portion 28a of the bottom plate 28 of the rotor yoke 14, a water shield ring 60 is attached by spot welding from the inner side surface (rear surface) side of the bottom wall 28 in a concentric manner with the boss portion 28a.

The water shield ring 60 is an annular shaped member that is firmed of the same material as the rotor yoke 14, and that is configured of an inner ring 60a and an outer ring 60b that is formed offset further in the axial direction than the inner ring 60a. The circumferential edge portion of the outer ring portion 60b is provided on the inner side of the circumferential wall of the insulator 19 of the stator 11 and near the midway portion in the height direction. An annular shaped concave groove is formed by the bottom wall 28 and the outer ring portion 60b. By this configuration, a third labyrinth portion 61 is formed between the outer ring portion 60b of the water shield ring 60 and the circumferential wall of the insulator 19.

For that reason, even in the case when water infiltrated into the region of the water shield ring 60, water is guided downward along the concave groove between the bottom wall 28 and the water shield ring 60, and discharged to the outside of the rotor yoke 14 via the aforementioned drain holes 61. As a result, infiltration of the water into the bearings 20a and 20b is prevented. Accordingly, water that has intruded into the interior of the rotor yoke 14 is prevented from infiltration into the bearings 20a and 20b by the third labyrinth portion 61. For that reason, leakage of lubricant from the bearings 20a and 20b is suppressed, and so the lubrication performance of the bearings 20a and 20b is maintained, and the resistance against sound vibration and the durability are improved.

On the other hand, a plurality of magnets 30 is attached along the circumferential direction on the inside surface of the circumferential wall 29 of the rotor yoke 14. These magnets 30 are attached so as to face the distal end of the teeth 18a of the stator 11. Also, an outer flange portion 33 in which the opening edge (rear end edge) 29a is bent toward the outer side in the radial direction is provided in a protruding manner at the circumferential wall 29 of the rotor yoke 14.

The opening edge 29a of the rotor yoke 14 that includes the outer flange portion 33 is arranged in the space between the infiltration restriction wall 52 of the bracket 12 and the cylindrical wall 26, in the state of that the rotor yoke 14 is assembled on the bracket 12 via the hearings 20a and 20b. The opening edge 29a of the rotor yoke 14 is configured so as to overlap with the infiltration restriction wall 52 and the cylindrical wall 26 by a predetermined amount in the radial direction. A lap region R1 (refer to the hatched portion) is formed by the rotor yoke 14, the infiltration restriction wall 52, and the cylindrical wall 26.

Further, the outer flange portion 33 functions as a restriction wall that restricts water droplets that have trickled down the outer circumferential surface of the circumferential wall 29 of the rotor yoke 14 from flowing into the opening edge 29a side, and functions as a reinforcement portion of the rotor yoke 14.

The fan body 3 is provided with a fan boss 34 that is formed in a bottomed cylindrical shape so as to cover the rotor yoke 14 from the front surface side, and a plurality of blades 35 that is provided so as to protrude radially from the outer circumferential surface of the fan boss 34. The fan boss 34 and the blades 35 are integrally formed of resin.

The fan boss 34 is a member in which a bottom wall 34a and a circumferential wall 34b that is formed so as to rise up toward the rear from the bottom wall 34a are integrally molded. An opening portion 36 is formed in the center of the bottom wall 34a. Moreover, a separate metal plate 37 is attached from the rear surface side to the bottom wall 34a so as to block the opening portion 36.

The metal plate 37 is a member that configures the shaft fixing portion to directly fix the fan body 3 to the rotation shaft 13. A fitting hole 38 in which a fan fixing portion 23 of the rotation shaft 13 is fitted is formed at the center of the metal plate 37. The fan body 3 is integrally coupled to the rotation shaft 13 by the metal plate 37 which is fitted on the fan fixing portion 23 of the rotation shaft 13 together with a washer 39, and a nut 40 which is fastened on the male thread portion 24 of the rotation shaft 13 that protrudes from the metal plate 37.

Also, the washer 39 that is fitted on the fan fixing portion 23 together with the metal plate 37 is formed so as to abut the proximal portion of the rotor support portion 22 which has a larger diameter than the fan fixing portion 23 on the rotation shaft 13. For that reason, a gap S1 that spaces apart in the axial direction is provided between the bottom wall 28 of the rotor yoke 14 and the metal plate 37.

In the case of the present embodiment, the metal plate 37 that is the shaft fixing portion is fixed by a plurality of screws 31 to the bottom wall of the fan boss 34. However, the fixing of the metal plate 37 to the fan boss 34 is not limited to screws, and the metal plate 37 may also be embedded and fixed by insert molding in the inner circumferential edge portion of the fan boss 34.

On the other hand, the edge portion of the opening portion 34d at the circumferential wall 34b of the fan boss 34 is arranged more to the outer side in the radial direction than the outer flange portion 53 of the infiltration restriction wall 52 in the bracket 12, in the state of that the fan body 3 is assembled via the metal plate 37 on the rotation shaft 13. The edge portion of the opening portion 34d of the circumferential wall 34b of the fan boss 34 is configured to overlap the infiltration restriction wall 52 by a predetermined amount in the radial direction, and is configured so that the gap between the circumferential wall 34b of the fan boss 34 and the outer flange portion 53 is constant. A lap region R2 (refer to the hatched portion) is formed by the circumferential wall 34b and the infiltration restriction wall 52. With this configuration, the opening portion side (rear end side) of the rotor yoke 14 is covered by the circumferential wall 34b of the fan boss 34 and the infiltration restriction wall 52 of the bracket 12.

Also, on the bottom wall 34a of the fan boss 34, further to the inside in the radial direction than the circumferential wall 34b, a second circumferential wall 34c is formed so as to rise up toward the rear end side. The second circumferential wall 34c is provided so as to extend from the bottom wall 34a to the front of the infiltration restriction wall 52 of the bracket 12. A blind alley portion 62 is formed by the bottom wall 34a and the circumferential wall 34b of the fan boss 34, in addition to the second circumferential wall 34c that is formed in this manner.

Also, a labyrinth portion 63 that suppresses infiltration of water into the interior of the rotor yoke 14 from the outside is configured of the circumferential wall 34b of the fan boss 34, the infiltration restriction wall 52 of the bracket 12, and the outer flange portion 53 that is formed at the infiltration restriction wall 52.

(Fan Shroud)

Figure 3:
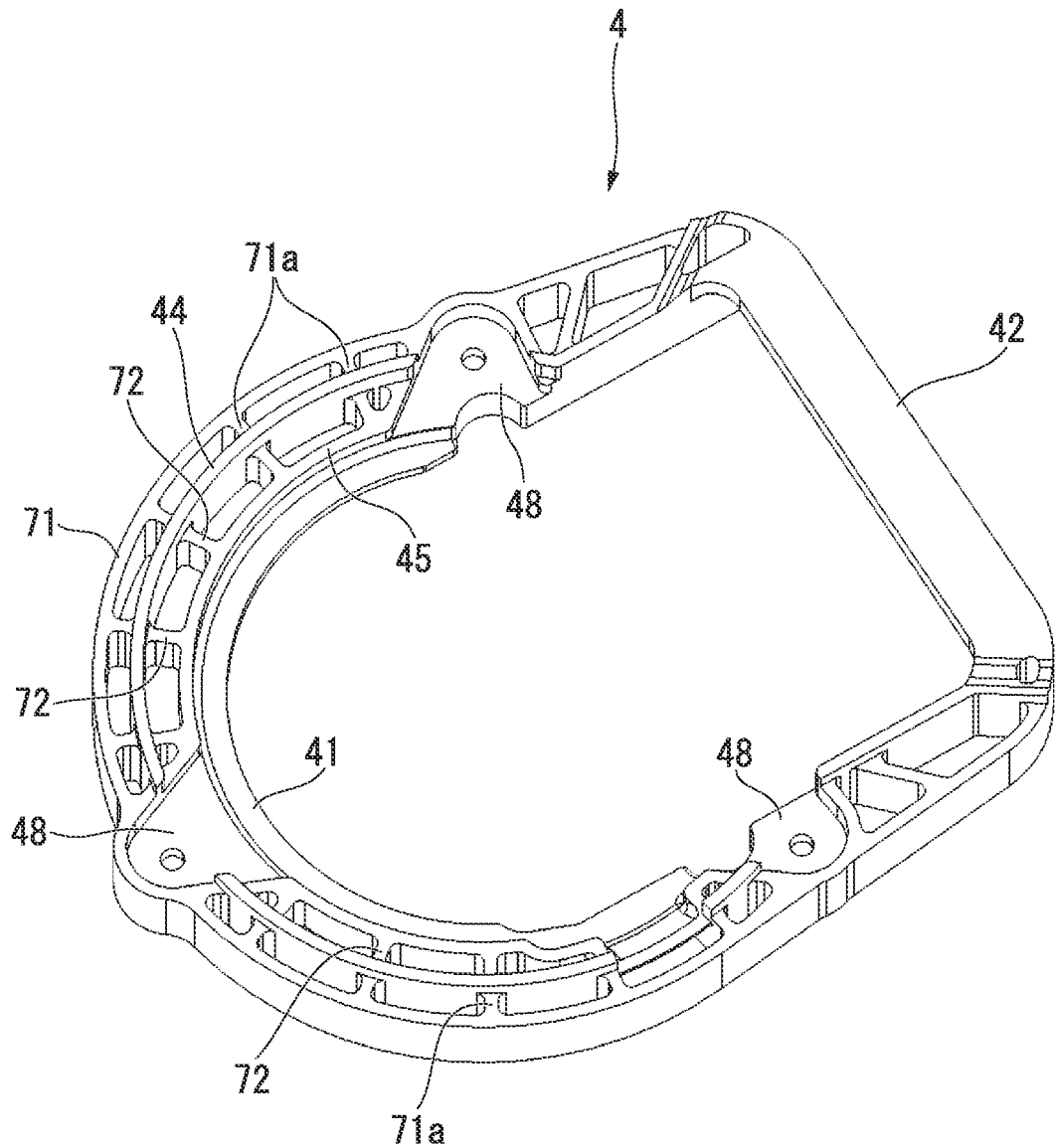
FIG. 3 is a perspective view of the fan shroud in one embodiment of the present invention.

FIG. 3 is a perspective view of the fan shroud.

As shown in FIG. 1 to FIG. 3, the fan shroud 4 that fixes the electric motor 2 is a member that is configured so as to be installed and fixed to the front side of the radiator. The fan shroud 4 has a base frame 41 that is formed in an approximate C shape so as to surround the circumference of the bracket 12. On the opening side of the base frame 41, a protection frame 42 is integrally molded so as to surround one side of the control unit 15. That is, the outline of the fan shroud 4 is formed in an approximate annular shape viewed from above.

The protection frame 42 is a member that protects the connector portions 59a and 59b so as to avoid contact between the connector portions 59a and 59b and external components, while avoiding interference with the connector portions 59a and 59b that are provided on the control unit 15.

Also, on the outer circumferential edge of the base frame 41, a flange base 43 is integrally molded so as to extend out toward the rear by a step. A cylindrical first infiltration restriction wall 44 that is formed so as to rise up toward the fan body 3 side is provided on the outer circumferential edge of the flange base 43. In the state of that the electric motor 2 is attached to the fan shroud 4, the first infiltration restriction wall 44 is formed so as to be positioned further to the outer side in the radial direction than the circumferential wall 34b of the fan boss 34.

The first infiltration restriction wall 44 is formed so as to overlap with the circumferential wall 34b of the fan boss 34 by a predetermined amount on the opening edge 44a side. With this configuration, a lap region R3 (refer to the hatched portion in FIG. 2) is formed by the first infiltration restriction wall 44 and the circumferential wall 34b of the fan boss 34.

As a result, the electric motor 2 is covered by the fan boss 34 and the fan shroud 4. Also, due to the formation of the lap region R3 by the circumferential wall 34b of the fan boss 34 and the first infiltration restriction wall 44 of the fan shroud 4, a first labyrinth portion 46 that suppresses the infiltration of water into the interior is configured.

Also, a reinforcement frame 71 that increases the rigidity of the base frame 41 is integrally molded on the circumference of the first infiltration restriction wall 44. The reinforcement frame 71 has a plurality of ribs 71a. Since the plurality of ribs 71a is provided on the outer circumferential surface of the first infiltration restriction wall 44, the overall rigidity of the base frame 41 increases.

Moreover, in the base frame 41, a step portion 43a that is formed in the space between the base frame 41 and the flange base 43, in other words, a cylindrical second infiltration restriction wall 45 that extends from the inner circumferential edge of the flange base 43 toward the fan body 3 is integrally molded. A plurality of ribs 72 is provided at equally spaced intervals in the circumferential direction between the first infiltration restriction wall 44 and the second infiltration restriction wall 45. As a result, the rigidity of the first infiltration restriction wall 44 and the second infiltration restriction wall 45 increases.

Also, the second infiltration restriction wall 45 is formed so as to extend from the base frame 41 to a near side of the circumferential wall 34b of the fan boss 34. Since the second infiltration restriction wall 45 is formed in this manner, a blind alley portion 47 is formed by the second infiltration restriction wall 45, the first infiltration restriction wall 44, and the flange base 43.

Moreover, in the state of that the electric motor 2 is attached to the fan shroud 4, the second infiltration restriction wall 45 is formed so as to be positioned further to the inner side in the radial direction than the circumferential wall 34b of the fan boss 34. In other words, in the state of that the electric motor 2 is attached to the fan shroud 4, and moreover the fan body 3 is attached to the electric motor 2, the opening portion 34d of the fan boss 34 is arranged in the blind alley portion 47 between the first infiltration restriction wall 44 and the second infiltration restriction wall 45.

A seat portion 48 that is capable of fitting with the fixing arm 12a is formed in the base frame 41 at regions which correspond to the fixing arm 12a of the bracket 12. When the bracket 12 is fixed in the state of that the fixing arms 12a are fit with the seat portions 48, a gap S2 is formed between the base frame 41 and the base portion 51 of the bracket 12.

Moreover, the base frame 41 and the base portion 51 of the bracket 12 are configured so as to overlap each other in the axial direction, and a lap region R4 (refer to the hatched portion in FIG. 2) is formed by the base frame 41 and the base portion 51. A second labyrinth portion 49 is configured of the base frame 41 and the base portion 51 of the bracket 12.

With the aforementioned configuration, a magnetic field is formed by the teeth 18a when electric current is supplied to the coils 10 of the electric fan 1. The rotor yoke 14 rotates due to the magnetic attractive force and repulsive force that is generated between the magnets 30 of the rotor yoke 14. As a result, cooling air is produced in the axial direction of the rotation shaft 13 by the fan body 3.

At this time, since the rotor yoke 14 and the fan boss 34 of the electric fan 1 cover the stator 11 from the front surface, intrusion of water from the front side of the stator 11 is prevented. On the other hand, even in the case when water is splashed on the outer circumferential portion of the fan boss 34, infiltration of the water into the interior of the electric motor 2 is suppressed since the first labyrinth portion 46 is configured of the circumferential wall 34b of the fan boss 34 and the first infiltration restriction wall 44 of the fan shroud 4, and the second labyrinth portion 49 is configured of the base frame 41 and the base portion 51 of the bracket 12.

(Function of First Labyrinth Portion, Second Labyrinth Portion, and Third Labyrinth Portion)

The functions of the first labyrinth portion 46, the second labyrinth portion 49, and the third labyrinth portion 61 will be described in closer detail based on FIG. 4.

FIG. 4 is an explanatory drawing for the behavior of water in the case when water is splashed on the outer circumferential portion of the fan shroud.

As shown in the drawing, even in the case when water is splashed on the outer circumferential portion of the fan shroud 4, since the first labyrinth portion 46 is formed between the fan shroud 4 and the outer circumferential portion 34b of the fan boss 34, the water is restrained from intruding into the interior portion from between the fan shroud 4 and the outer circumferential portion 34h of the fan boss 34 (refer to arrow Y1 in FIG. 4).

Further, it is desirable that the lap region R3 in which the first labyrinth portion 46 is formed (refer to FIG. 2) as large as possible. The larger the lap region R3 is formed, the more effectively the infiltration of water is suppressed.

Here, even if water intrudes into the interior from the space between the fan shroud 4 and the circumferential wall 34b of the fan boss 34, since the blind alley portion 47 is formed by the first infiltration restriction wall 44 and the second infiltration restriction wall 45, and the flange base 43 of the fan shroud 4, the intrusion path of the water to the electric motor 2 is formed complicated and long. For this reason, water is restrained from entering the interior of the electric motor 2.

Also, since the blind alley portion 47 is formed in the fan shroud 4, infiltration of water from the rear of the fan shroud 4 (the right side in FIG. 4) into the interior of the electric motor 2 is prevented (refer to arrow Y2 in FIG. 4).

Moreover, even if water intrudes into the interior along the blind alley portion 47, since the infiltration restriction wall 52 is integrally molded to the base portion 51 of the bracket 12, and moreover the outer flange portion 53 is integrally molded to the opening edge 52a of the infiltration restriction wall 52, water is restrained from taking a roundabout path to the electric motor 2 side from the bracket 12.

Also, since the gap S2 is formed between the base frame 41 and the base portion 51 of the bracket 12, water that has intruded into the interior via the fan shroud 4 and dripped onto the infiltration restriction wall 52 of the bracket 12 is discharged to the outside along the gap S2.

Moreover, due to the formation of the gap S2, cooling effect for the bracket 12 is enhanced. That is, since the stator 11 of the electric motor 2 is attached to the bracket 12, the heat of the electric motor 2 is easily transmitted to the bracket 12. At this time, since the gap S2 is formed between the bracket 12 and the fan shroud 4, air passes through this gap S2, and cooling effect for the bracket 12 is enhanced. As a result, the radiation performance of the bracket 12 with respect to the electric motor 2 also improves.

Also, since the base frame 41 and the base portion 51 of the bracket 12 are firmed so as to overlap in the axial direction via the gap S2, and the second labyrinth portion 49 is formed, infiltration of water from the rear of the fan shroud 4 to the interior of the bracket 12 side is restrained (refer to the arrow Y3 in FIG. 4).

Further, it is desirable that the lap region R4 in which the second labyrinth portion 49 is formed (refer to FIG. 2) as large as possible. The larger the lap region R3 is formed, the more effectively the infiltration of water is suppressed.

Also, the water shield ring 60 is attached from the rear surface side of the bottom wall 28 around the boss portion 28a of the bottom wall 28 of the rotor yoke 14. The circumferential edge portion of the outer circumference thereof is provided on the inner side of the circumferential wall of the insulator 19 and near the midway portion in the height direction, whereby the third labyrinth portion 61 is formed. For that reason, it is possible to prevent water that has intruded into the interior of the rotor yoke 14 from reaching the bearings 20a and 20h.

(Effects)

According to the aforementioned embodiment, the lap region R3 (refer to the hatched portion in FIG. 2) is formed by the first infiltration restriction wall 44 of the fan shroud 4 and the circumferential wall 34b of the fan boss 34, and the first labyrinth portion 46 is formed. For that reason, it is possible to cover the electric motor 2 by the fan boss 34 and the fan shroud 4. As a result, it is possible to effectively suppress the infiltration of water into the interior of the fan shroud 4, in other words, the interior of the electric motor 2.

Due to the formation of the lap region R3 by the first infiltration restriction wall 44 of the fan shroud 4 and the circumferential wall 34b of the fan boss 34, it is possible to form the first labyrinth portion 46 with a simple structure. For that reason, it is possible to inexpensively suppress the infiltration of water into the interior of the electric motor 2.

Also, at the base frame 41 of the fan shroud 4, the first infiltration restriction wall 44 is formed to rise up, and the second infiltration restriction wall 45 is firmed so as to rise up to the inside in the radial direction of the first infiltration restriction wall 44, and the blind alley portion 47 is formed by the first infiltration restriction wall 44, the second infiltration restriction wall 45, and the flange base 43. For that reason, the intrusion path of the water to the electric motor 2 is formed complicated and long, and it is possible to more reliably suppress the infiltration of water into the interior of the electric motor 2.

Moreover, while the gap S2 is provided between the base portion 51 of the bracket 12 and the base frame 41 of the fan shroud 4, the base portion 51 and the base frame 41 are formed so as to overlap in the axial direction, and the second labyrinth portion 49 is formed. For that reason, with a simple structure it is possible to quickly discharge water that has intruded into the interior of the fan shroud 4 while suppressing the infiltration of water from the rear of the fan shroud 4 into the interior of the fan shroud 4. Thereby, it is possible to prevent water from accumulating in the interior. In addition, it is possible to enhance cooling effect for the bracket 12, and it is possible to suppress heat damage to the electric motor 2.

Also, even in the case of water having intruded into the interior of the rotor yoke 14, it is possible to prevent the water from reaching the bearings 20a and 20b by the third labyrinth portion 61. For that reason, leakage of the lubricant from the bearings 20a and 20b is suppressed, and so the lubrication performance of the bearings 20a and 20b is maintained, and the resistance against sound vibration and the durability are improved.

In this way, since the cooling fan 1 of the present embodiment is provided with a threefold water infiltration prevention structure by the first labyrinth portion 46, the second labyrinth portion 49 and the third labyrinth portion 61, it is possible to reliably prevent the bearings 20a and 20b from getting wet.

Further, the present invention is not limited to the aforementioned embodiment, and includes various modifications to the aforementioned embodiment without departing from the scope of the present invention.

For example, in the aforementioned embodiment, a description was given for the case of that the first labyrinth portion 46 that suppresses the infiltration of water into the interior is configured of the rap region R3 which is formed by the circumferential wall 34b of the fan boss 34 and the first infiltration restriction wall 44 of the fan shroud 4. However, it is not limited to the aforementioned configuration, and provided that a labyrinth portion is formed between the fan shroud 4 and the circumferential wall 34b of the fan boss 34, the shape of the labyrinth portion is not particularly specified.

Also, in the aforementioned embodiment, a description was given for the case when the base frame 41 and the base portion 51 of the bracket 12 are formed so as to overlap each other in the axial direction, the lap region R4 (refer to the hatched portion in FIG. 2) is formed by the base frame 41 and the base portion 51, and the second labyrinth portion 49 is configured of the base frame 41 and the base portion 51 of the bracket 12. However, it is not limited to the aforementioned configuration, and provided that a labyrinth portion is formed between the bracket 12 and the fan shroud 4, the shape of the labyrinth portion is not particularly specified.

INDUSTRIAL APPLICABILITY

According to the present invention, it is possible to cover an electric motor with a fan boss and a fan shroud. Also, due to the formation of a first labyrinth portion between the fan boss and the fan shroud, the intrusion path of water into the interior of the electric motor is made complicated. For that reason, it is possible to effectively suppress the infiltration of water into the interior of the electric motor.

REFERENCE SIGNS LIST 1 electric fan
2 electric motor
3 fan body
4 fan shroud
10 coil
11 stator
12 bracket
13 rotation shall
14 rotor yoke
34 fan boss 34*b* circumferential wall
34*d* opening portion
35 blade
41 base frame (base portion)
42 protection frame (base portion)
43 flange base (base portion)
44 first infiltration restriction wall
45 second infiltration restriction wall
46 first labyrinth portion
49 second labyrinth portion
51 base portion
60 water shield ring
61 third labyrinth portion

What is claimed is:

1. An electric fan comprising:
an electric motor;
a fan body that is attached to the electric motor; and
a fan shroud that is configured to fix the electric motor,
wherein the electric motor comprises:
a stator on which coils are wound;
a rotation shaft provided in a center of the stator in a radial direction, and that is provided rotatably with respect to the stator;
a rotor yoke provided on the rotation shaft and formed in a bottomed cylindrical shape so as to cover the stator from a front surface of the stator; and
a bracket being formed so as to cover a rear surface of the stator and that fixes the stator to the fan shroud,
wherein the fan body is provided so as to integrally rotate with the rotation shaft and the rotor yoke,
wherein the fan body comprises:
a fan boss formed in a bottomed cylindrical shape so as to cover a front surface of the rotor yoke;
a plurality of blades that protrude outward in the radial direction from an outer circumferential surface of the fan boss,
wherein a first labyrinth portion is provided between an opening portion of the fan boss and the fan shroud,
wherein the fan shroud comprises:
a base portion to which the bracket is attached; and
a cylindrical first infiltration prevention wall formed at an outer circumferential portion of the base portion so as to rise toward the fan body, and that covers the opening portion of the fan boss from an outer side in the radial direction,
wherein a circumferential wall of the fan boss and the first infiltration prevention wall are formed so as to overlap each other in the radial direction, and
wherein the first labyrinth portion is formed by the circumferential wall of the fan boss and the first infiltration prevention wall.

2. The electric fan according to claim 1, wherein
a cylindrical second infiltration prevention wall is formed to rise at the base portion so as to extend to a near side of the circumferential wall of the fan boss, more to an inner side in the radial direction than the first infiltration prevention wall.

3. The electric fan according to claim 1, wherein
the bracket is configured by integrally forming a base portion formed in an approximate disk shape so as to cover the rear surface of the stator, an approximately cylindrical infiltration prevention wall that is formed so as to rise from an outer edge of the base portion toward the stator in an axial direction, and an outer flange portion that is formed at an opening edge of the infiltration prevention wall toward an outer side in the radial direction, the bracket of the electric motor is fixed by fastening to the fan shroud,
the fan body is attached to the rotor yoke of the electric motor so as to integrally rotate therewith, and
the first labyrinth portion is formed by the circumferential wall of the fan boss and the infiltration prevention wall of the bracket and the outer flange portion.

4. The electric fan according to claim 1, wherein a second labyrinth portion is provided between the fan shroud and the bracket.

5. The electric fan according to claim 4, wherein
the base portion of the fan shroud is formed so as to have an opening portion in a center region, and have an approximate annular shape, and overlap with an outer circumferential portion of the bracket in an axial direction,
wherein the fan shroud is formed so that a gap is formed between the base portion and the bracket,
wherein the second labyrinth portion is between the bracket and the base portion.

6. The electric fan according to claim 2, wherein
a second labyrinth portion is provided between the fan shroud and the bracket.

7. The electric fan according to claim 3, wherein
a second labyrinth portion is provided between the fan shroud and the bracket.

8. The electric fan according to claim 4, wherein
the rotor yoke comprises a bottom wall and a circumferential wall that is formed so as to rise from the bottom wall in an axial direction,
a boss portion that protrudes to a same side as the circumferential wall is integrally formed in a center of the rotor yoke in the radial direction, and
a water shield ring is attached around the boss portion, in close proximity to the stator from an inner side surface side of the bottom wall, and a third labyrinth portion is provided between the water shield ring and the stator.

9. The electric fan according to claim 5, wherein
the rotor yoke comprises a bottom wall and a circumferential wall that is formed so as to rise from the bottom wall in an axial direction,
a boss portion that protrudes to a same side as the circumferential wall is integrally formed in a center of the rotor yoke in the radial direction, and
a water shield ring is attached around the boss portion, in close proximity to the stator from an inner side surface side of the bottom wall, and a third labyrinth portion is provided between the water shield ring and the stator.

10. The electric fan according to claim 6, wherein
the rotor yoke comprises a bottom wall and a circumferential wall that is formed so as to rise from the bottom wall in an axial direction,
a boss portion that protrudes to a same side as the circumferential wall is integrally formed in a center of the rotor yoke in the radial direction, and
a water shield ring is attached around the boss portion, in close proximity to the stator from an inner side surface side of the bottom wall, and a third labyrinth portion is provided between the water shield ring and the stator.

11. The electric fan according to claim 7, wherein
the rotor yoke comprises a bottom wall and a circumferential wall that is formed so as to rise from the bottom wall in the axial direction,
a boss portion that protrudes to a same side as the circumferential wall is integrally formed in a center of the rotor yoke in the radial direction, and
a water shield ring is attached around the boss portion, in close proximity to the stator from an inner side surface side of the bottom wall, and a third labyrinth portion is provided between the water shield ring and the stator.

12. An electric fan comprising:

an electric motor;

a fan body that is attached to the electric motor; and a fan shroud that is configured to fix the electric motor, wherein the electric motor comprises:

a stator on which coils are wound;

a rotation shaft provided in a center of the stator in a radial direction, and that is provided rotatably with respect to the stator;

a rotor yoke provided on the rotation shaft and formed in a bottomed cylindrical shape so as to cover the stator from a front surface of the stator; and a bracket being formed so as to cover a rear surface of the stator and that fixes the stator to the fan shroud, wherein the fan body is provided so as to integrally rotate with the rotation shaft and the rotor yoke, wherein the fan body comprises:

a fan boss formed in a bottomed cylindrical shape so as to cover a front surface of the rotor yoke;

a plurality of blades that protrude outward in the radial direction from an outer circumferential surface of the fan boss, wherein a first labyrinth portion is provided between an opening portion of the fan boss and the fan shroud, wherein a second labyrinth portion is provided between the fan shroud and the bracket, wherein a base portion of the fan shroud is formed so as to have an opening portion in a center region, and have an approximate annular shape, and overlap with an outer circumferential portion of the bracket in an axial direction, wherein the fan shroud is formed so that a gap is formed between the base portion and the bracket, and wherein the second labyrinth portion is between the bracket and the base portion.

\* \* \* \* \*